June 5, 1923.                         1,457,901
A. B. FOANS
RACE GAME
Filed April 25, 1921
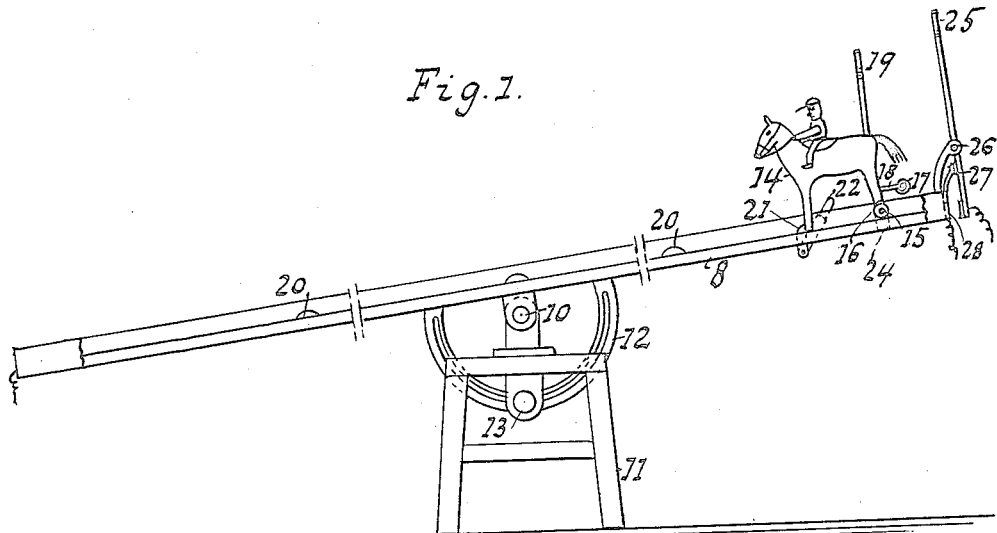
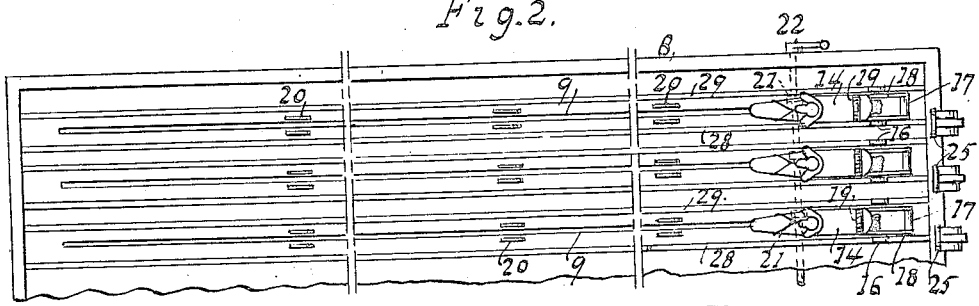
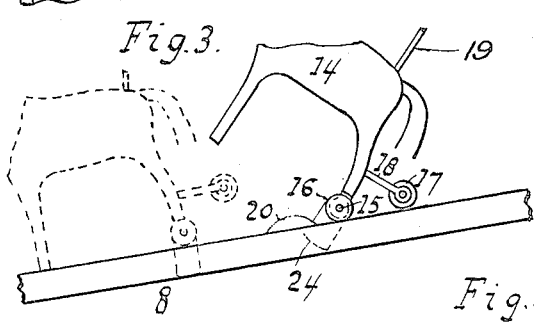
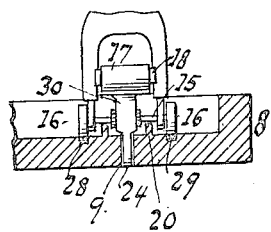
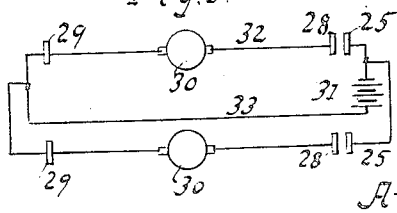
INVENTOR
Andrew B. Foans
BY his ATTORNEYS Patented June 5, 1923.

1,457,901

UNITED STATES PATENT OFFICE.

ANDREW B. FOANS, OF NEW YORK, N. Y.

RACE GAME.

Application filed April 25, 1921. Serial No. 464,134.

*To all whom it may concern:*

Be it known that I, ANDREW B. FOANS, a citizen of the United States, residing at New York, in the county of New York and State of New York, have invented new and useful Improvements in Race Games, of which the following is a specification.

This invention relates essentially to an amusement device in which a number of animals or carriages are arranged side by side and adapted to be propelled along a platform or course in simulation of a horse race.

An object of the invention is to provide a number of targets, each being actuated by a missile and made to control the movement of any of the individual carriages along the platform.

Another object of the invention is to provide means for interrupting the movement of the carriage by the automatic resetting of its individual target.

The invention resides more particularly in the novel combinations hereinafter described and claimed, reference being made to the accompanying drawing in which:

Fig. 1 represents a side elevation of a device embodying this invention.

Fig. 2 is a plan view of the same.

Fig. 3 is a detail view on an enlarged scale showing the carriage in its different positions.

Fig. 4 is a rear view of the carriage showing the platform in section.

Fig. 5 is a diagram of the electrical connections.

In the drawing the numeral 8 designates a platform having a series of parallel longitudinal slots 9 formed in the platform. The platform is swingingly mounted at 10 on a frame 11 and a slotted segment 12 secured to the platform coacting with a pin 13 permits the platform to be set at an inclined plane relative to the frame. On the platform are arranged a number of carriages 14 made in the form of horses to simulate a horse race. The rear legs of each horse carry a shaft 15 provided with a pair of wheels 16 each being fixed to the end of the shaft as indicated in Fig. 4.

A roller 17 is mounted on brackets 18 projecting from the rear legs above the shaft. Surmounting the animal is disposed a target 19 which when hit by a ball thrown by a person will rock the animal as indicated in Fig. 3, the roller 17 contacts with the platform and the animal will be propelled down the inclined plane. When it rolls a short distance along the platform the said roller strikes projections 20 located at intervals in its path and throws it upwards so that the front portion of the animal will by its weight gravitate downward until the fore feet strike the surface of the platform as shown in dotted lies in Fig. 3. In this position the animal slowly slides down the incline the front legs serving as a brake to interrupt its movement.

There can be any number of horses in the race and they are held at the barrier or starting place as indicated in Fig. 1 by levers 21 engaging the legs of the horses and actuated by a hand lever 22 within reach of the operator to simultaneously release all the animals. The animals slowly roll down the inclined course when released until the target is struck by a missile which swings the horse backward to accelerate its movement. In order to prevent lateral displacement of the animal a shoe 24 carried by the lower hind legs slides in the slot 9 in the platform. This shoe also keeps the horse in a rectilinear path in its journey to the end of the course. When the animal reaches the end of the course the platform can be swung with its rear higher than the front so that the animals will roll backward to the starting point.

A device for increasing the interest in the game includes a series of auxiliary targets 25 arranged in a row at the back of the other targets, each target controlling one of the animals by the impact of an object or a missile to close an electric current. The target is swingingly mounted at 26 to the platform and a spring 27 normally holds it out of contact with a narrow strip of metal 28 extending along the platform and always in contact with one of the wheels of the carriage. This strip of metal constitutes a feeder while an opposite strip of similar metal 29 in contact with the other wheel of the carriage serves as a return circuit. An electric motor 30 is mounted on the shaft 15 of the carriage. This motor when energized by a battery 31 will rotate the wheels and accelerate the movement of the carriage along the course. Each horse carries a motor and each motor is controlled by the actuation of an individual target. When any of the auxiliary rear targets are struck by the impact of a thrown ball it swings backward, the lower end contacts with the feed rail 28 and the current passes through wire 32 to the motor thence to the return rail 29 through the wire 33 to the battery. The spring 27 slowly returns the target to its vertical position thus opens the circuit and interrupts the movement of the horse.

I claim:

1. In a game the combination with an inclined platform, of a rockable carriage arranged on the platform, means carried by the carriage actuated by the impact of an object for rocking the carriage to propel it forward, and means for interrupting the movement of the carriage.

2. In a game the combination with an inclined platform, of a rockable carriage arranged on the platform, means carried by the carriage actuated by the impact of an object for rocking the carriage to accelerate its propulsion, and means for interrupting the movement of the carriage.

3. In a game the combination with an inclined platform, of a rockable carriage arranged on the platform, a target carried by the carriage actuated by the impact of a missile for rocking the carriage backward to accelerate its propulsion, and means in the path of the carriage for rocking it forward to interrupt its movement.

4. In a game the combination with an inclined platform having a slot, of a rockable carriage arranged on the platform, a target carried by the carriage actuated by the impact of a missile for rocking the carriage backward to accelerate its propulsion, means in the path of the carriage for rocking it forward to interrupt its movement, and means coacting with the said slot to guide the carriage.

5. In a game the combination with a platform having a slot, of a carriage arranged on the platform, means for propelling the carriage forward and backward by positioning the platform, manually controlled means for rocking the carriage backward to accelerate its movement, means in the path of the carriage for rocking it forward to interrupt its movement, and a shoe disposed on the lower portion of the carriage coacting with the said slot to guide the carriage in a rectilinear path.

In testimony whereof I have hereunto set my hand in the presence of two subscribing witnesses.

ANDREW B. FOANS.

Witnesses:
SAMUEL LEWIS,
WILLIAM MILLER.